June 13, 1939.  E. C. REARICK  2,161,888
METHOD OF MAKING ELECTRICAL CONDENSER
Filed Dec. 8, 1937
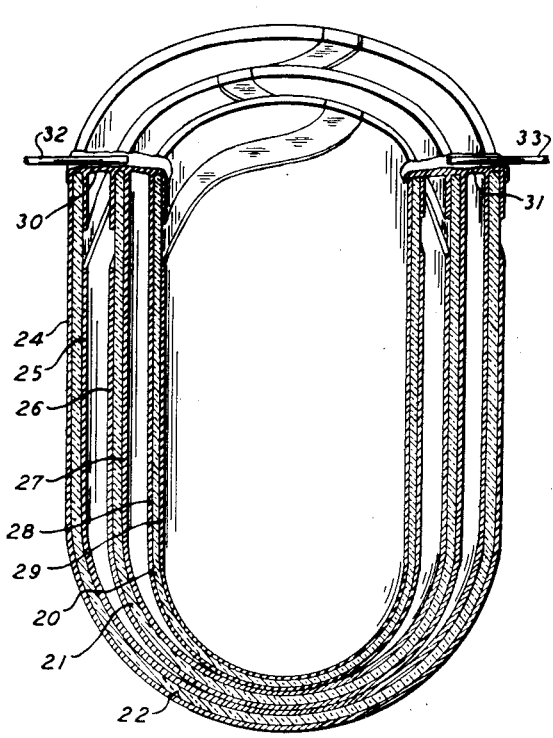
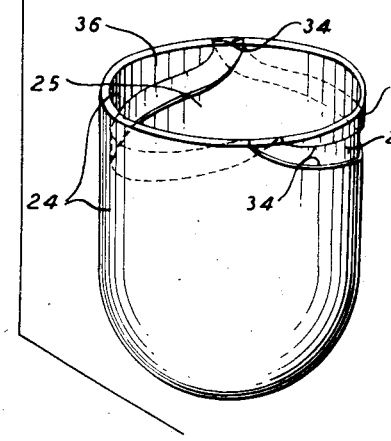
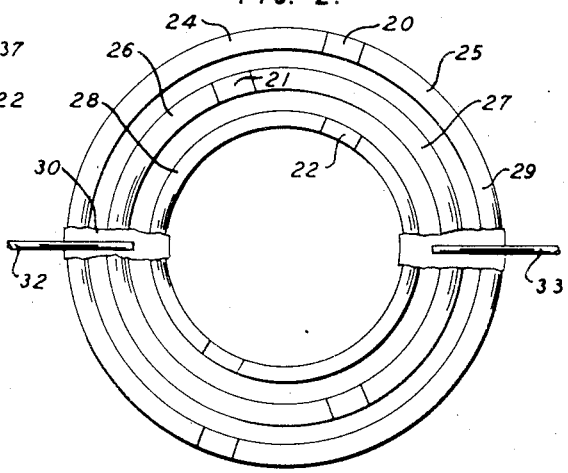
INVENTOR
E. C. REARICK
BY
E.R. Nowlan
ATTORNEY Patented June 13, 1939

2,161,888

UNITED STATES PATENT OFFICE 2,161,888

METHOD OF MAKING ELECTRICAL CONDENSER

Edward C. Rearick, Cranford, N. J., assignor to Western Electric Company, Incorporated, New York, N. Y., a corporation of New York Application December 8, 1937, Serial No. 178,637

6 Claims. (Cl. 175—41)

This invention relates to a method of making electrical condensers and more particularly to a method of making precision electrical condensers comprising solid dielectric plates of quartz, glass or the like, intercalated with conductive plates of metal.

In the manufacture of electrical condensers which are to be used as elements of electrical circuits of extreme constancy of value of electrical constants, condensers are sometimes made which have metal plates separated from each other by dielectric solid members or plates of quartz, glass or other suitable solid material; and, for various reasons, the plates of such condensers are frequently formed as a nested plurality of telescopically interfitted tubes or thimbles. Furthermore, it is often important to so design and construct condensers as to reduce to a practicable minimum the space occupied by the completed condenser.

An object of the present invention is to provide a method of making an electrical condenser of the general type described, which condenser shall be simple in construction, occupy a minimum of space, be of high electrical efficiency, and be of a high degree of constancy of value of electrical constants.

With the above and other objects in view, one embodiment of the invention may be presented in the method of making an assembly for an electrical condenser which method comprises the steps of applying a strip of combustible material upon a portion of the surface of a member of insulating material, applying a coating of metalliferous material upon the surface of the member and of the strip, and heating to destroy the strip by combustion.

Other objects and features of the invention will appear from the following detailed description of one embodiment of the invention taken in connection with the accompanying drawing in which the same reference numerals are applied to identical parts in the several figures and in which Fig. 1 is a central longitudinal sectional view of an electrical condenser constructed in accordance with the invention;

Fig. 2 is a plan view thereof, and

Fig. 3 is an exploded view thereof on a reduced scale in side elevation.

The embodiment of the invention herein disclosed is a method of making an electrical condenser comprising three dielectric plates 20, 21 and 22, two single metallic plates 24 and 29 and two double metallic plates 25, 26 and 27, 28, the three dielectric plates being intercalated between the four metallic plates in alternating relation. Alternate metal plates are electrically connected to each other and to conductor terminals 32 and 33 as at 30 and 31.

In the particular instance illustrated the dielectric plates are tubular with one end closed hemispherically so that they have a thimble shape. These are preferably composed of molded quartz, but may also be of any other suitable moldable dielectric material, e. g. the high silicia glass commercially known as "Pyrex" or analogous materials. These thimbles are so dimensioned and proportioned that they may be easily nested as shown in Fig. 1, plate 22 nesting inside of plate 21 and both inside of plate 20. Preferably also, when thus nested, their upper runs will lie approximately in one plane transverse to their common axis.

For clarity of description and explanation, the cylindrical portions of the three thimble shaped dielectric plates are shown spaced well apart. In practice these spacings will preferably be as small as will conveniently permit the thimbles and their coatings to be assembled in nested relation without harm to the metallic plates or coatings carried by them.

Metal plates 24 and 25 are coatings of metallic material, preferably silver but of any suitable and suitably deposited metal, deposited on and adherent to the dielectric thimble 20. A convenient method of making these plates is by coating the thimble inside and out with a metalliferous paint or paste of silver oxide in an inflammable vehicle such as turpentine, and then heating the coated thimble in an appropriate retort or oven to a temperature at which the vehicle is burned away and the silver oxide reduced to metallic silver. The silver deposit thus produced is closely adherent to the dielectric, substantially entirely metallic in character and dense and electrically conductive throughout. In order to divide the metal deposit thus formed, e. g. into the two plates 24 and 25 on the thimble 20, before the silver oxide preparation is applied, a strip or ribbon of cleanly combustible material, such as cellulose acetate, is laid or cemented over the rim of the open end of the thimble, partly in a loop inside the thimble and partly in a loop outside, in the form shown in the space 34 between the edges of the plates 24 and 25 in Fig. 3. When the subsequently coated thimble is heated, this strip or ribbon of combustible material burns away and no metal is deposited on the dielectric over the area covered by the ribbon. The two coatings 26, 27 and 28, 29 on thimbles 21 and 22 are made by the same method.

Thus each dielectric thimble has two closely adherent superficial metallic coatings, one chiefly inside and one chiefly outside, separated by a continuous narrow strip of bare dielectric. On the thimble 20, the coating 24 is entirely on the outer surface of the thimble, except for the small portion 36 where the coating 24 extends over the rim and for a short distance down over the inner surface of the thimble; and, similarly, the coating 25 is entirely on the inner surface the thimble 20 except for the small portion 37 which extends over the rim and down over a small area of the outer surface of the thimble. Preferably, the bare strip 34 of dielectric separating the two coatings will cross the rim of the thimble at diametrically opposed points of the rim.

The three doubly coated thimbles are assembled in the nested relation shown in Figs. 1 and 2. Coatings 25 and 26, the outer coat of thimble 20 and the inner coat of thimble 21, are then in electrical contact where the rounded outer face of the bottom of thimble 21 rests on the rounded inner face of the bottom of thimble 20. Thus coatings 25 and 26 are electrically a single metallic condenser plate intercalated between the two dielectric plates 20 and 21. In the same way, the two metal coatings 27 and 28 on the thimbles 21 and 22 respectively become a single metal condenser plate intercalated between the dielectric plates 21 and 22. The metal coatings 24 and 29 become the first and last metal plates of the condenser, which latter then consists of four metal plates with three intercalated dielectric plates.

The coated thimbles are so assembled that plates 24, 26 and 28 have their respective parts overlapping the rims of the thimbles all on the same side of the condenser, and the plates 25, 27 and 29 all overlap on the opposite side. A drop or body 30 of a suitable solder, e. g., one of the usual alloys of lead and tin, with silver added to effect a good electrical union with the filmy metallic plates, is then applied to connect plates 24, 26 and 28 and in this may also be embedded a conductor or terminal member 32. Similarly, plates 25, 27 and 29 are connected to each other and to a conductor or terminal 33 by a drop or body of solder 31.

The invention is described herein as producing a condenser comprising thimble shaped plates, but it is obviously not so limited; but various modifications in and departures from the disclosure may be made without departing from the spirit and scope of the invention as pointed out in and limited solely by the appended claims.

What is claimed is:

1. A method of making a plate assembly for an electrical condenser which method comprises the steps of applying a strip of combustible material upon two faces of a plate of dielectric material and over the rim between the two faces so as to define two areas each lying chiefly on one face of the dielectric plate but extending in part over the rim and a portion of the other face of the plate applying a coating of metalliferous material over the two faces of the plate and over the strip, and heating to destroy the strip by combustion.

2. A method of making a plate assembly for an electrical condenser which method comprises the steps of applying a strip of combustible material upon two faces of a plate of dielectric material and over the rim between the two faces so as to define two areas each lying chiefly on one face of the dielectric plate but extending in part over the rim and a portion of the other face of the plate, applying a coating of material comprising a metallic oxide over the two faces of the plate and over the strip, and heating to destroy the strip by combustion and to reduce the oxide to metal.

3. A method of making a plate assembly for an electrical condenser which method comprises the steps of applying a strip of combustible material upon two faces of a plate of dielectric material and over the rim between the two faces so as to define two areas each lying chiefly on one face of the dielectric plate but extending in part over the rim and a portion of the other face of the plate, applying a coating of material comprising a metallic oxide and a reducing agent over the two faces of the plate and over the strip, and heating to destroy the strip by combustion and to reduce the oxide to metal.

4. A method of making a plate assembly for an electrical condenser which method comprises the steps of applying a strip of combustible material upon two faces of a plate of dielectric material and over the rim between the two faces so as to define two areas each lying chiefly on one face of the dielectric plate but extending in part over the rim and a portion of the other face of the plate, applying a coating of material comprising silver oxide and a reducing agent over the two faces of the plate and over the strip, and heating to destroy the strip by combustion and to reduce the silver oxide to metallic silver.

5. The method of making an assembly for an electrical condenser which method comprises the steps of applying a strip of combustible material upon a portion of the surface of a member of insulating material, applying a coating of metalliferous material upon the surface of the member and of the strip, and heating to destroy the strip by combustion.

6. The method of making an assembly for an electrical condenser which method comprises the steps of applying a strip of combustible material upon a portion of the surface of a member of insulating material, applying a coating of metalliferous material upon the surface of the member and of the strip, and heating to destroy the strip by combustion and to reduce the metalliferous material to metal.

EDWARD C. REARICK.